(12) United States Patent
Gardner et al.

(10) Patent No.: US 10,330,553 B2
(45) Date of Patent: Jun. 25, 2019

(54) LOWPASS RESONATOR AND PARTICULATE FILTER FOR A PRESSURE TRANSDUCER

(71) Applicant: KULITE SEMICONDUCTOR PRODUCTS, INC., Leonia, NJ (US)

(72) Inventors: Robert Gardner, Westwood, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 134 days.

(21) Appl. No.: 15/666,681

(22) Filed: Aug. 2, 2017

(65) Prior Publication Data

US 2018/0052069 A1 Feb. 22, 2018

Related U.S. Application Data

(60) Provisional application No. 62/375,467, filed on Aug. 16, 2016.

(51) Int. Cl.
*G01L 7/00* (2006.01)
*G01L 19/06* (2006.01)

(52) U.S. Cl.
CPC ................. *G01L 19/0636* (2013.01)

(58) Field of Classification Search
CPC ............ G01L 19/147; G01L 9/0042; G01L 9/0072; G01L 13/025; G01L 19/04; G01L 9/0054; G01L 9/0075; G01L 19/0038; G01L 19/0084; G01L 19/14; G01L 19/0069; G01L 19/0618; G01L 19/0645; G01L 9/0055; G01L 9/0073; G01L 19/0092; G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006;
(Continued)

(56) References Cited

U.S. PATENT DOCUMENTS 4,189,627 A * 2/1980 Flanagan .............. H04R 1/22
381/353
9,116,056 B2 8/2015 Gardner et al.
(Continued)

*Primary Examiner* — Andre J Allen
(74) *Attorney, Agent, or Firm* — Troutman Sanders LLP; James E. Schutz; Mark Lehi Jones

(57) ABSTRACT

The disclosed technology includes a transducer assembly having a first transducer element. The transducer assembly includes a first filter element adjacent to least of portion of the first transducer element such that a first cavity is defined between the first filter element and the first transducer element. The first filter element includes a plurality of machined passageways in communication with the first cavity. The transducer assembly also includes an inlet passage having a first end in communication with a first external portion of the transducer assembly and a second end in communication with the plurality of machined passageways.

20 Claims, 4 Drawing Sheets

(58) Field of Classification Search
CPC ....... G01L 9/007; G01L 9/0076; G01L 9/045;
G01L 9/06; G01L 9/065; G01L 9/12;
G01L 9/125; G01L 11/00; G01L 17/00;
G01L 19/00; G01L 19/0015; G01L
19/003; G01L 19/0076; G01L 19/02;
G01L 19/08; G01L 19/141; G01L 19/145;
G01L 19/146; G01L 1/142; G01L 1/2262;
G01L 1/246; G01L 21/12; G01L 23/16;
G01L 27/005; G01L 27/007; G01L 7/04;
G01L 7/063; G01L 7/082; G01L 7/084;
G01L 7/086; G01L 7/16; G01L 9/0002;
G01L 9/0007; G01L 9/0016; G01L
9/0019; G01L 9/0022; G01L 9/0027;
G01L 9/0033; G01L 9/0039; G01L 9/005;
G01L 9/0058; G01L 9/0077; G01L
9/0079; G01L 9/008; G01L 9/0092; G01L
9/0095; G01L 9/025; G01L 9/04; G01L
9/08; G01L 9/085; G01L 9/105; G01L
9/14; G01L 9/16
USPC .................................................. 73/700–756
See application file for complete search history.

(56) References Cited

U.S. PATENT DOCUMENTS

| 2010/0242615 | A1* | 9/2010 | Sato ...................... G01L 9/0022 73/702 |
| 2013/0220029 | A1* | 8/2013 | Gardner .................. G01L 15/00 73/862.52 |
| 2014/0202260 | A1* | 7/2014 | Nakamura ............ B81B 3/0021 73/862.59 |
| 2015/0308911 | A1* | 10/2015 | Pechstedt .............. G01L 9/0008 73/579 |

* cited by examiner

US 10,330,553 B2

LOWPASS RESONATOR AND PARTICULATE FILTER FOR A PRESSURE TRANSDUCER

CROSS-REFERENCE TO RELATED APPLICATIONS

This application claims priority to U.S. Provisional Patent Application Ser. No. 62/375,467, filed on 16 Aug. 2016, the contents of which are hereby incorporated by reference in their entirety as if presented herein in full.

TECHNICAL FIELD

The disclosed technology relates to a pressure transducer assembly configured with a mechanical low pass resonator and a particulate filter having multiple passageways for the measurement media to enter the transducer.

BACKGROUND

The frequency response of pressure transducers can be critically important for many measurements. In some applications, it is important to have very fast response times such that transient pressure phenomena may be measured. However, in other applications, it may be important to slow down or reduce transients in the applied pressures to insure the long-term survivability of the pressure transducer. In fuel and hydraulic systems there is often a steady state pressure that is important to monitor; however, in addition to this steady state pressure, there are dynamic pressure associated with pump ripple, valve opening and closing, etc. The dynamic pressures may be many times the steady state pressure and their frequencies are often such that they can excite the resonant frequency of the tubing. This resonance excitation can further amplify the dynamic pressures and cause them to permanently damage the pressure transducer, particularly if the transducer is designed to monitor the relatively low static pressure.

There are many different transducer structures designed to mitigate these dynamic pressures. Adding a pressure snubber or resonator in the front of the transducer is the most common way to control pressure amplitudes at certain frequencies. There are also transducer housing designs, such as described in U.S. Pat. No. 9,116,056 that can eliminate or reduce transients. Such transducer designs often rely on a single narrow path (with or without an in-line sintered/porous filter structure) in communication with a cavity to act as a Helmholtz resonator, with resonance characteristics designed such that high frequency pressure components are attenuated. Such designs can work quite well, but a filter having a single path and/or an in-line porous filter can become clogged over time when particulates in the measurement media accumulate. Such a clogged path/filter can cause the transducer to malfunction.

BRIEF SUMMARY

The disclosed technology relates to pressure transducers and, in particular, to a pressure transducer assembly that includes a mechanical filter element having multiple machined passageways for which the measurement media may traverse. The filter element disclosed herein may enable a pressure transducer to operate reliably, even when a portion of the multiple passageways become blocked or clogged.

According to an example implementation of the disclosed technology, a transducer assembly is provided. The transducer assembly includes a first transducer element. The transducer assembly further includes a first filter element adjacent to at least a portion of the first transducer element such that a first cavity is defined between the first filter element and the first transducer element. The first filter element includes a plurality of machined passageways in communication with the first cavity. The transducer assembly also includes an inlet passage having a first end in communication with a first external portion of the transducer assembly and a second end in communication with the plurality of machined passageways.

The disclosed technology includes a method for making a transducer assembly. The method can include machining multiple passageways in a filter element, and installing the filter element in a transducer assembly between an inlet port and a transducer.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
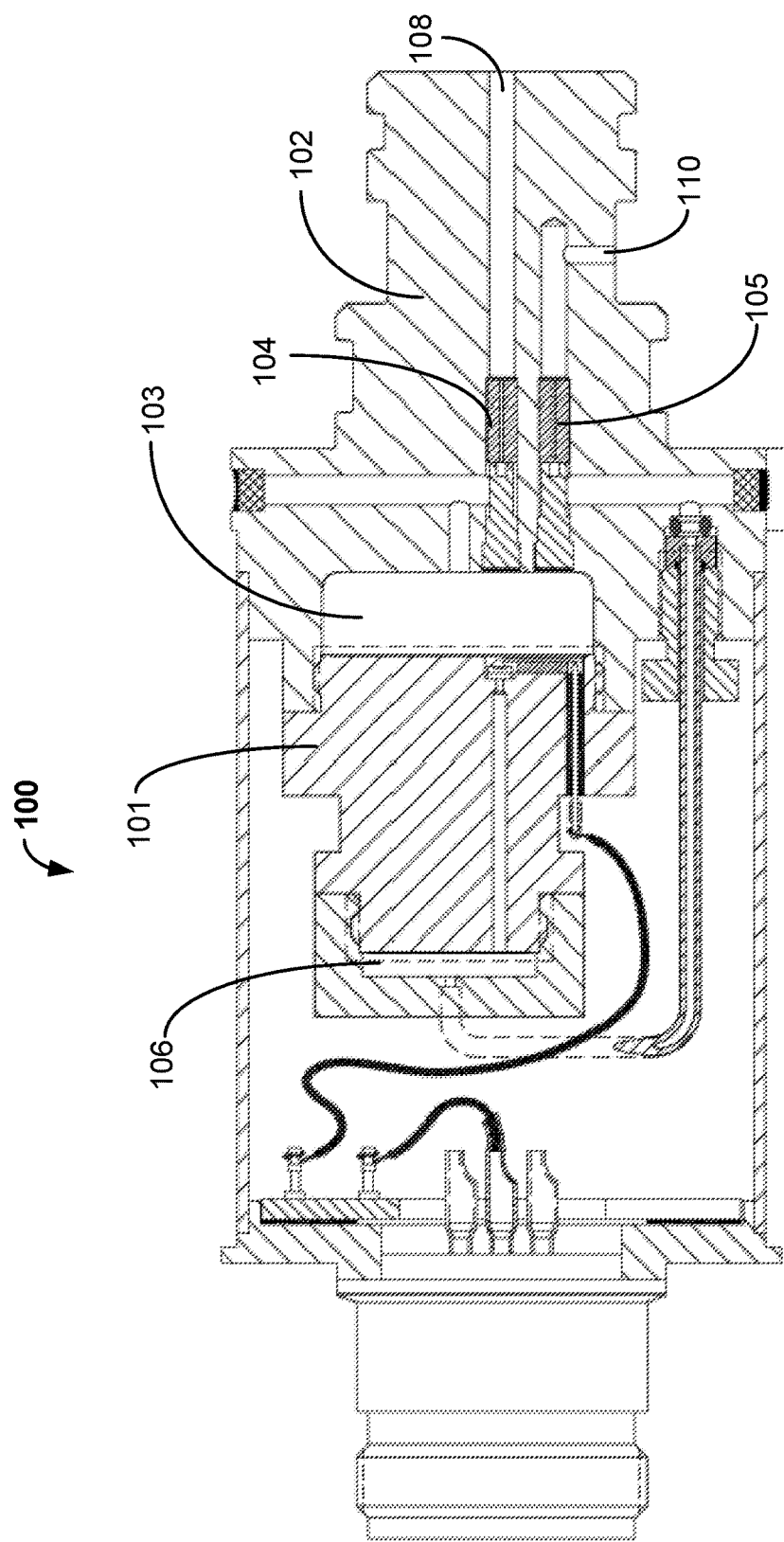
FIG. 1 depicts a standard pressure transducer 100 having a single narrow path and porous-type mechanical filter 104 in line with the inlet port 108.

Although many embodiments of the disclosed technology are explained in detail, it is to be understood that other embodiments are contemplated. Accordingly, it is not intended for the disclosed technology to be limited in scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

As discussed herein, the term "filter" is intended to refer to a mechanical element that can prevent passage of particles of a certain predetermined size and larger. As discussed herein, the term "resonator" is intended to refer to a structure having an inlet, an outlet, and a cavity there between, which may be used to control pressure phase and/or amplitude. An example resonator structure is a Helmholtz resonator, which may be utilized to attenuate certain pressure oscillation frequencies. To avoid confusion, the terms "filter" or "filtering," (which have traditionally been used interchangeably to refer to such resonance control) will be reserved herein to refer to particulate blocking, even though the mechanical filter disclosed herein may form part of a resonator structure.

Referring now to the figures, in which like numerals represent like elements, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may desirable and/or required for implementation. However, because such elements are well known in the art, and because they do not facilitate a better understanding of the disclosed technology, a discussion of such elements is not provided herein.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream. For example, in one illustrative embodiment, the transducer assembly may be configured to measure the dynamic and/or static oil pressure within a machine. In certain example implementations, the condition stream may include particulate matter. Certain example implementations of the disclosed technology may include features that can reduce, minimize, or eliminate particulate clogging within the transducer assembly.

Certain example implementations of the disclosed technology can include a transducer assembly having one or more multi-passageway filter elements disposed between the inlet port and the transducer. In certain example implementations, the filter element may be part of a lowpass resonator, such as a Helmholtz resonator. In certain example implementations of the disclosed technology, the multiple passageways defined in the filter element may help reduce clogging, for example due to particulates in the condition stream. According to an example implementation of the disclosed technology, the multiple passageways defined in the filter may be machined such that precise control of the passageway diameters may be achieved.

FIG. 1 shows a standard pressure transducer 100 in which a mechanical filter element 104 is disposed in-line with the main inlet port 108 (with a similar filter element 105 shown disposed in-line with a reference port 110). In some designs, the mechanical filters 104 105 may be a sintered metal filter, or other type of porous mechanical structure used to restrict the path of fluid. In other designs, the mechanical filters 104 105 may include a single, small diameter path to restrict the path of fluid. The filters 104 105 can be either brazed or press fit in-line with the respective ports 108 110. In this example, a pressure header 101 is welded onto a pressure port 102 to form a cavity 103. The restricted path, along with the cavity 103 forms a Helmholtz resonator. When the fluid viscosity is high enough (such as with fuel or hydraulic fluids) the resonator acts as a damper for high frequencies (typically over a few hertz). In some designs, the reference filter 105 may be disposed in the path of the reference port 110 and, together with the second cavity 106, may form another resonator structure. This allows for a differential measurement where both pressures are attenuated. Depending on the particular application this reference port 110 or filter 105 may or may not be necessary.

Figure 2:
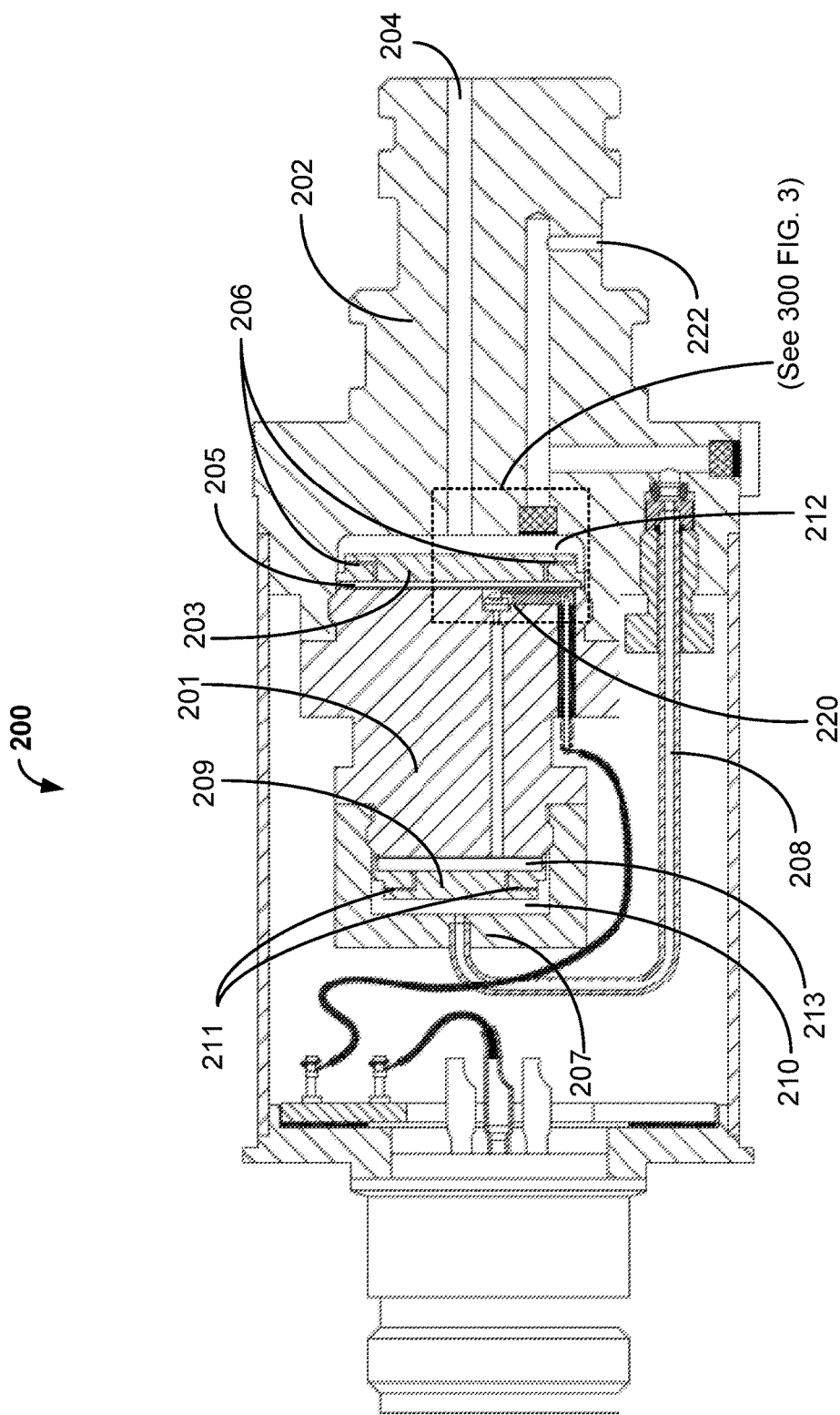
FIG. 2 depicts a pressure transducer assembly 200 according to an example implementation of the disclosed technology. The pressure transducer 200 includes a filter element 203 having multiple passageways 206 to prevent clogging.

FIG. 2 depicts an example pressure transducer assembly 200 in accordance with the disclosed technology. In an example implementation, a first filter element 203 may be disposed in a cavity 212 defined between the pressure port 202 and the pressure header 201, for example, so that the medium traversing through the inlet passage 204 may flow into the cavity 212, through multiple passageways 206 defined in the first filter element 203, and to a transducer element 220 disposed on the pressure header 201. According to an example implementation of the disclosed technology, the first filter element 203 may be attached to the pressure port 202 by one or more welds and/or other suitable means of attachment, such as press-fit, threads, adhesives, etc. Similarly, the pressure header 201 may then be attached to the pressure port 202 (with the first filter element 203 disposed there between) by one or more welds and/or other suitable means of attachment, such as press-fit, threads, adhesives, etc.

In an example implementation, the pressure port 202 can include a single large diameter inlet passage 204 in communication with the cavity 212; the cavity 212 may be in communication with the first filter element 203; and the first filter element 203 may be in communication with the pressure header 201 and the transducer element 220. According to an example implementation of the disclosed technology, a cavity 205 (such as a Helmholtz cavity) may be formed between the transducer element 220 and the first filter element 203.

In an example implementation, the first filter element 203 may include well defined, multiple narrow passageways 206 that allow the measurement medium to flow between the first cavity 212 and the cavity 205 adjacent the transducer element, while restricting particulate matter. In certain example implementations, the passageways 206 may be machined, drilled, or the like, for example, to control rejection of particulate matter of a given size or larger. According to an example implementation of the disclosed technology, the multiple passageways 206 defined in the first filter 203 (and/or in the multiple passageways 211 defined in the second filter 209) may be machined such that precise control of the passageway diameters may be achieved. In this respect, the passageways 206 may be machined with controlled size and controlled distribution for a given application, rather than having to rely upon (an uncontrolled) passage size and distribution of a typical sintered or otherwise porous filter structure.

FIG. 2 depicts the first filter element 203 with only two passageways 206, however, according to certain example implementations of the disclosed technology, there may be many more passageways 206 (not shown) defined around the circumference or other regions of the first filter element 203 to provide additional paths through the first filter 203. This may be particularly advantageous in the event that some of the passageways 206 become clogged. In certain example implementations, (as will be explained below with reference to FIG. 3) one or more particle trapping recesses and/or channels may be machined into the filter 203, for example, to capture and hold certain particles.

In accordance with certain example implementations of the disclosed technology, the multiple small passageways 206 defined in the first filter element 203 in combination with at least the second cavity 206 form a tunable Helmholtz resonator, which can be made to attenuate higher frequencies depending on the viscosity of the media and geometry of the system. By virtue of the multiple passageways 206, even if one or several of the passageways 206 become clogged, the transducer assembly will continue to function properly, although the cut-off frequency may change. In many applications, the exact value of the cut-off frequency is not important, so clogging of one or more passageways 206 may not appreciably impact the usability of the transducer assembly 200, which may operate with suitable results even if one or several of the passageways 206 become clogged.

With continued reference to FIG. 2, and in an example implementation of the disclosed technology, the pressure transducer assembly 200 may be configured so that it is capable of also measuring a reference pressure. For example, a reference pressure at a reference port 222 may be routed through a reference tube 208, through a second filter element 209, and to a transducer. In certain example implementations, the reference pressure may be routed to the back side of the transducer element 220 to provide a differential measurement. In other example implementations, a second transducer (not shown) may be utilized to measure the filtered reference pressure.

In certain example implementations, the second filter element 209 may be disposed on an opposite end of the pressure header 201 (i.e., opposite the first filter element 203). In certain example implementations, a third cavity 213 may be defined between the second filter element 209 and the pressure header. According to an example implementation of the disclosed technology, a cap 207 may be attached to the pressure header 201 and a fourth cavity 210 in communication with the reference tube 208 may be defined between the cap 207 and the second filter element 209. Depending on the configuration of the transducer assembly 200, the reference pressure may be routed to the fourth cavity 210 from a different reference port (not shown) disposed on the side or back of the transducer assembly 200. In certain example implementations, the second filter element 209 may be omitted, as it may not be needed for all applications.

In a similar manner as described above with reference to the first filter element 203, the second filter element 209 may also include multiple small machined passageways 211, which may allow taking a reference pressure measurement with suitable results even if a portion of the passageways 211 become clogged.

Figure 3:
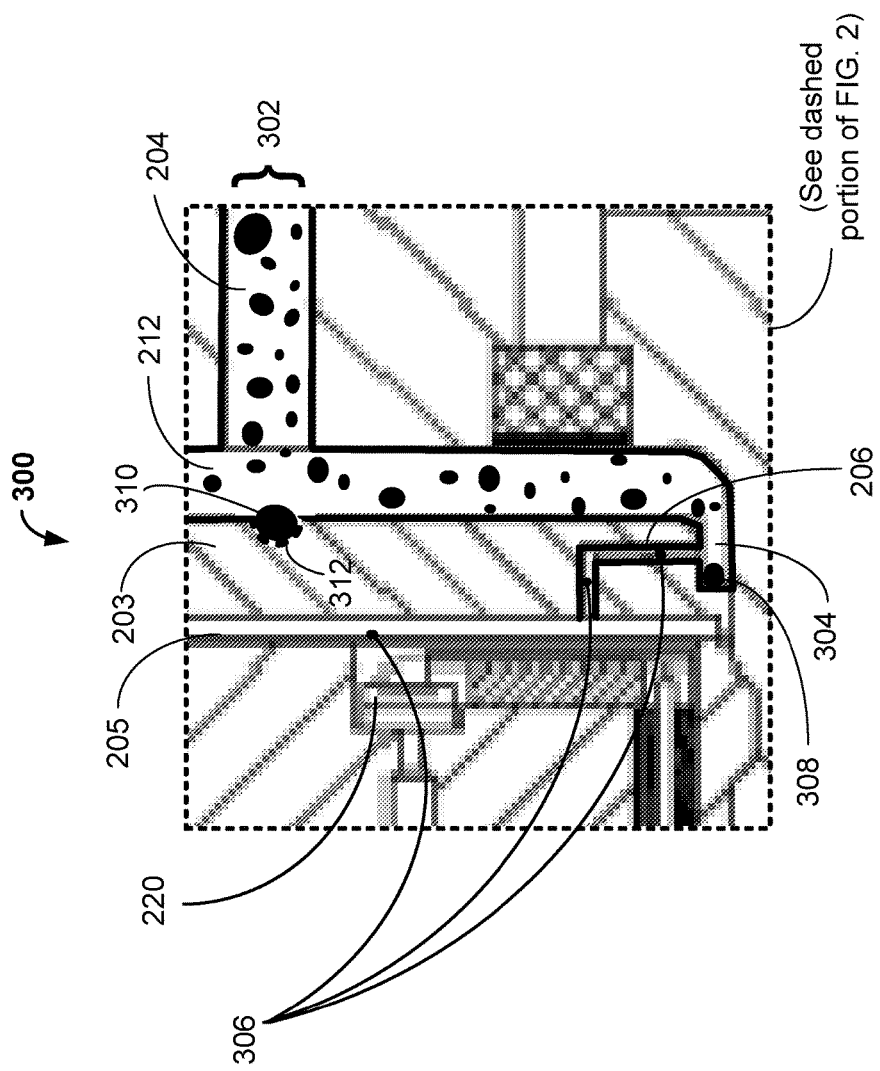
FIG. 3 is an inset view 300 of a portion of FIG. 2, depicting example particulate matter 302 restricted by the filter element 203 from reaching the cavity 205 adjacent the transducer element 220.

FIG. 3 is an inset view 300 of a portion of FIG. 2 (see dashed box, FIG. 2), depicting example particulate matter 302 that may be restricted by the filter element 203 from reaching the cavity 205 adjacent to the transducer element 220. Also depicted in FIG. 3, certain example implementations may include one or more particle trapping recesses 312 and/or particle diversion channels 304 to capture and hold certain particles to further reduce clogging. For example, the diversion channel 304 may include a small "holding area" past the entrance of the passageways 206 for which certain medium sized particles 308 may gather without blocking the entrance to the passageways 206. In certain example implementations, one or more particle trapping recesses 312 may be machined into the surface of the filter element 203 (and/or in the surface of the pressure port 202). According to an example implementation of the disclosed technology, the particle trapping recesses 312 may be machined with a size (or distribution of sizes) suitable for trapping particles of a given size, such as larger particles 310.

As depicted in FIG. 3, small particles 306 (that are smaller than the diameter of the passageways 206 of the filter element 203) may be allowed to freely move within the structure, and may end up within the cavity 205 without harming the transducer element 220. As discussed herein, particles having dimensions greater than the dimensions of the passageways 206 may be retained, trapped, or blocked.

In one example implementation, a diameter of one or more of the passageways 206 may be 1-5 micrometers. In another example implementation, a diameter of one or more of the passageways 206 may be 10-20 micrometers. In another example implementation, a diameter of one or more of the passageways 206 may be 20-100 micrometers. In another example implementation, a diameter of one or more of the passageways 206 may be 100-500 micrometers.

One advantage of the disclosed technology over previous structures is that the Helmholtz filters on either side of the pressure header 201 may be formed using similar sized cavities, so it is much easier to match the attenuation of the two Helmholtz filters. Certain previous designs required excess tubing between the reference filter and header than from main filter and header making it difficult to match the frequency response. In some application it is important to match this response so that there is no phase delay at low frequencies of interest.

Figure 4:
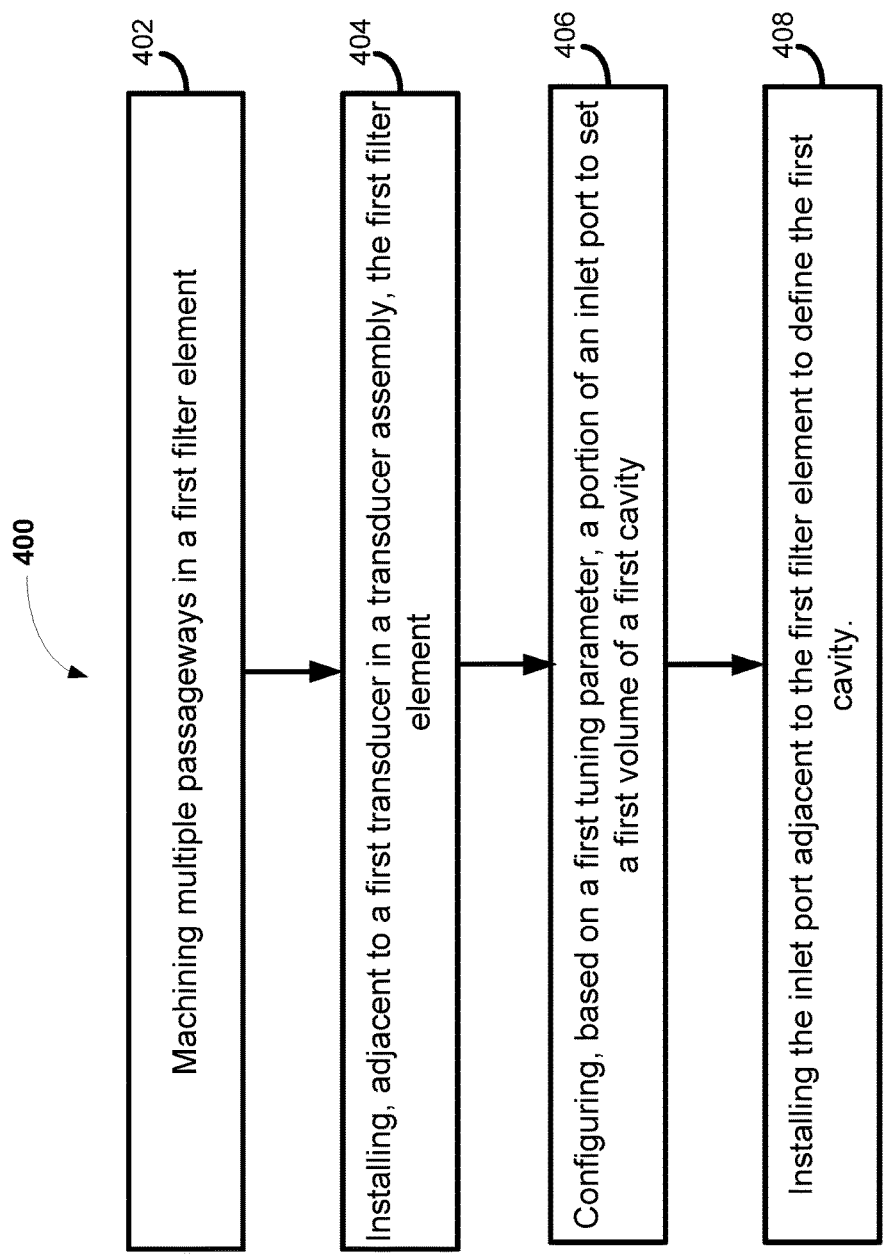
FIG. 4 is a flow diagram of a method 400, according to an example implementation of the disclosed technology.

FIG. 4 is a flow diagram of a method 400, according to an example implementation of the disclosed technology. In block 402, the method 400 includes machining multiple passageways in a first filter element. In block 404, the method 400 includes installing, adjacent to a first transducer in a transducer assembly, the first filter element. In block 406, the method 400 includes configuring, based on a first tuning parameter, a portion of an inlet port to set a first volume of a first cavity of a first cavity. In block 408, the method 400 includes installing the inlet port adjacent to the first filter element to define the first cavity.

Certain example implementations can include machining multiple passageways in a second filter element, and installing, adjacent to a second transducer in the transducer assembly, the second filter element.

Some example implementations may include configuring, based on a second tuning parameter, a second volume of a second cavity that my be defined by and/or in communication with a portion of a cap and a portion of the second filter element. Certain example implementations include installing the cap adjacent to the second filter element to define the second cavity.

In some example implementations, the first tuning parameter and the second tuning parameter may be substantially equivalent.

According to an example implementation of the disclosed technology, machining the multiple passageways can include drilling corresponding multiple holes through at least a periphery of the filter element. In certain example implementations, and as depicted by the right angle passageways 206 in FIGS. 2 and 3, machining the multiple passageways can include machining first multiple bores into a first side of the filter element 203 such that the first multiple bores extend partially through the filter element 203 (to define, for example, the vertical portion of the passageway 206). The passageways may be completed by machining corresponding second multiple bores into a second side of the filter element and extending partially through the filter element (to define, for example, the horizontal portion of the passageway 206) such that the first and second multiple bores join to form corresponding passageways through the filter element.

According to an example implementation of the disclosed technology, a transducer assembly is provided. The transducer assembly includes a first transducer element. The transducer assembly further includes a first filter element adjacent to least of portion of the first transducer element such that a first cavity is defined between the first filter element and the first transducer element. The first filter element includes a plurality of machined passageways in communication with the first cavity. The transducer assembly also includes an inlet passage having a first end in communication with a first external portion of the transducer assembly and a second end in communication with the plurality of machined passageways.

In certain example implementations, the inlet passage is configured to receive a first incoming condition stream from the first external portion of the transducer assembly and to channel the first incoming condition stream to the first filter element. In certain example implementations, the first filter element is configured to channel the first incoming condition stream through the plurality of machined passageways to the first cavity and the first transducer element.

In certain example implementations, the plurality of machined passageways are configured to restrict movement of particulate matter in first incoming condition stream from at least the inlet passage to the first cavity.

According to an example implementation of the disclosed technology, the first transducer element is configured to measure the first incoming condition stream.

In certain example implementations, the volume of the first cavity is set based on tuning parameters for the transducer element, wherein the tuning parameters comprise at least damping.

According to an example implementation of the disclosed technology, the first filter element can include one or more particle trapping recesses.

According to an example implementation of the disclosed technology, the first filter element can include one or more particle diversion channels.

In an example implementation, the plurality of machined passageways are configured with predetermined dimensions.

Certain example implementations may further include a second transducer element, a second filter element adjacent to at least of portion of the second transducer element such that a second cavity is defined between the second filter element and the second transducer element, wherein the second filter element comprises a plurality of second machined passageways in communication with the second cavity, and a reference tube having a first end in communication with a first external portion of the transducer assembly and a second end in communication with the plurality of the second machined passageways.

In some embodiments, the reference tube may be configured to receive a second incoming condition stream from the second external portion of the transducer assembly and to channel the second incoming condition stream to the second cavity.

According to an example implementation of the disclosed technology, the first transducer element and the second transducer element are substantially identical in configuration.

In certain example implementations, the first transducer element and the second transducer element may be the same element.

According to an example implementation of the disclosed technology, the first sensing element and second sensing element are pressure sensing elements.

In some implementations, the first cavity and the second cavity are substantially identical in configuration.

It shall be understood that the transducer assembly described herein may be configured to sense and measure an applied condition from an incoming condition stream, for example but not limited to, temperature and/or pressure. It shall be further understood that each sensing element within the transducer assembly may be configured to measure a different condition, or alternatively, measure the same condition under different ranges. For example, a first sensing element may measure pressure and a second sensing element may measure temperature. As another example, a first sensing element may measure pressure having a first range and a second sensing element may measure pressure having a second range. Once the sensing element measures an applied condition, it outputs a signal indicative of the applied condition to an external device.

Also, in describing the many embodiments, certain terms have been used for the sake of clarity. It is intended that each term contemplates its broadest meaning as understood by those skilled in the art and includes all technical equivalents which operate in a similar manner to accomplish a similar purpose.

The mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

It will be apparent to those skilled in the art that modifications and variations may be made in the apparatus and process of the present invention without departing from the spirit or scope of the invention. It is intended that the present disclosure cover the modification and variations of the technology within the scope of the appended claims and their equivalents.

What is claimed is:

1. A transducer assembly, comprising:
   a first transducer element;
   a first filter element adjacent to at least a portion of the first transducer element such that a first cavity is defined between the first filter element and the first transducer element, wherein the first filter element comprises a plurality of machined passageways in communication with the first cavity; and
   an inlet passage having a first end in communication with a first external portion of the transducer assembly and a second end in communication with the plurality of machined passageways.

2. The transducer assembly of claim 1, wherein the inlet passage is configured to receive a first incoming condition stream from the first external portion of the transducer assembly and to channel the first incoming condition stream to the first filter element, and wherein the first filter element is configured to channel the first incoming condition stream through the plurality of machined passageways to the first cavity and the first transducer element.

3. The transducer assembly of claim 2, wherein the plurality of machined passageways are configured to restrict movement of particulate matter in the first incoming condition stream.

4. The transducer assembly of claim 2, wherein the first transducer element is configured to measure the first incoming condition stream.

5. The transducer assembly of claim 1, wherein a volume of the first cavity is set based on tuning parameters for the transducer element, wherein the tuning parameters comprise at least damping.

6. The transducer assembly of claim 1, wherein the first filter element comprises one or more particle trapping recesses.

7. The transducer assembly of claim 1, wherein the first filter element comprises one or more particle diversion channels.

8. The transducer assembly of claim 1, wherein the plurality of machined passageways are configured with predetermined dimensions.

9. The transducer assembly of claim 1, further comprising:
   a second transducer element;
   a second filter element adjacent to at least of portion of the second transducer element such that a second cavity is defined between the second filter element and the second transducer element, wherein the second filter element comprises a plurality of second machined passageways in communication with the second cavity; and
   a reference tube having a first end in communication with a first external portion of the transducer assembly and a second end in communication with the plurality of the second machined passageways.

10. The transducer assembly of claim 9, wherein the reference tube is configured to receive a second incoming condition stream from the second external portion of the transducer assembly and to channel the second incoming condition stream to the second cavity.

11. The transducer assembly of claim 9, wherein the first transducer element and the second transducer element are substantially identical in configuration.

12. The transducer assembly of claim 9, wherein the first transducer element and the second transducer element are the same element.

13. The transducer assembly of claim 9, wherein the first sensing element and second sensing element are pressure sensing elements.

14. The transducer assembly of claim 9, wherein the first cavity and the second cavity are substantially identical in configuration.

15. A method, comprising:
   machining multiple passageways in a first filter element;
   installing, adjacent to a first transducer in a transducer assembly, the first filter element;
   configuring, based on a first tuning parameter, a portion of an inlet port to set a first volume of a first cavity; and
   installing the inlet port adjacent to the first filter element to define the first cavity.

16. The method of claim 15, further comprising:
   machining multiple passageways in a second filter element;
   installing, adjacent to a second transducer in the transducer assembly, the second filter element.

17. The method of claim 16, further comprising:
   configuring, based on a second tuning parameter, a cap to set a second volume of a second cavity; and
   installing the cap adjacent to the second filter element to define the second cavity.

18. The method of claim 17, wherein the first tuning parameter and the second tuning parameter are substantially equivalent.

19. The method of claim 15, wherein machining the multiple passageways comprises drilling corresponding multiple holes through at least a periphery of the first filter element.

20. The method of claim 15, wherein machining the multiple passageways comprises:
   machining first multiple bores into a first side of the first filter element and extending partially through the first filter element; and
   machining corresponding second multiple bores into a second side of the first filter element and extending partially through the first filter element, wherein the first and second multiple bores join to form corresponding passageways through the first filter element.

* * * * *